United States Patent Office 3,751,556
Patented Aug. 7, 1973

3,751,556
BENEFICIATION PROCESS FOR
TITANIFEROUS ORES
Jack Whitehead, Acklam, Frank Ronald Williams, Rudby, and Derek Vernon Gosden and Graham Woodhouse, Horsham, England, assignors to British Titan Limited, Billingham, Teesside, England
No Drawing. Filed May 14, 1971, Ser. No. 143,629
Claims priority, application Great Britain, May 16, 1970, 23,851/70
Int. Cl. C01g 23/02, 25/04, 25/06
U.S. Cl. 423—82                                  15 Claims

ABSTRACT OF THE DISCLOSURE

A process for the removal of soluble titanium from a solution obtained by leaching an iron-containing titaniferous material with aqueous hydrochloric acid by the addition of phosphoric acid or a phosphate, preferably in the presence of an oxidising agent, whereby the soluble titanium is precipitated in an insoluble form.

The present invention relates to a process for the beneficiation of iron-containing titaniferous material.

There are a number of methods for producing a solid material containing an increased proportion of titanium by the removal of iron from an iron-containing titaniferous material. For example, the iron-containing titaniferous material in particulate form may be extracted with aqueous hydrochloric acid. Additionally, before such extraction, the particulate iron-containing titaniferous material may be subjected to a number of preliminary steps such as preliminary oxidation and reduction at elevated temperatures to provide the iron content of the material in the correct state of valency for the most effective extraction by aqueous hydrochloric acid and/or the resulting iron chloride solution in the most suitable valency state for subsequent utilisation, for example for the recovery of hydrogen chloride and/or of finely divided iron oxide or metallic iron.

It has now been found that the presence of titanium in the iron chloride solution is undesirable since it contaminates the iron or iron oxide recovered from the iron chloride and may render it unusable for its intended purpose.

An object of the present invention is to provide a process whereby the amount of titanium in an iron chloride solution, for example as produced as described above, is reduced.

Accordingly, the present invention is a process comprising (a) leaching a particulate iron-containing titaniferous material with aqueous hydrochloric acid to form a solid material containing an increased proportion of titanium and a liquid containing dissolved iron and titanium,
(b) separating the solid titanium-containing material from the liquid,
(c) adding phosphoric acid or a suitable salt thereof to the solution containing iron and titanium to precipitate a titanium phosphate, and
(d) separating the iron-containing solution from the precipitated titanium phosphate and thereafter recovering hydrogen chloride and/or iron oxide or metallic iron from the solution.

The iron-containing titaniferous material which is leached with hydrochloric acid may be particulate material which has been subjected to a preliminary oxidation and/or reduction or it may be material such as ilmenite or leucoxene which is untreated (apart from the physical separation steps which are normally applied to such materials).

The iron content of the starting material will normally be in the range 5% to 55% and particularly in the range 30% to 46% by weight, expressed as FeO. The titanium content is usually in the range 30% to 70% and particularly in the range 40% to 60% by weight, expressed as $TiO_2$.

The preferred mean weight particle size of the material to be leached is in the range $50\mu$ to $300\mu$ and particularly in the range $50\mu$ to $200\mu$.

The aqueous hydrochloric acid used in leaching may be any strength of such acid which will remove the desired amount of iron in an acceptable time. It is preferred, however, to use acid containing between 18% and 22% by weight of hydrogen chloride, for example constant boiling point acid (at atmospheric pressure).

The leaching is normally carried out at a temperature in the range 80° C. to the boiling point (under atmospheric pressure) but, as previously mentioned, any temperature is suitable at which the desired amount of iron is removed in an acceptable period of time.

The same conditions apply to the other requirements of leaching although it is preferred to utilise a two stage leaching process in which the first stage is carried out with aqueous hydrochloric acid which already contains dissolved iron and titanium, normally from its use (initially as fresh acid) in the second stage, and the second stage is then carried out with new acid (which may then be re-used in the first stage of the next extraction). Such a two stage process is described for example, in our U.S. application No. 60,122.

To the liquor is then added phosphoric acid or a suitable salt thereof. A suitable salt of phosphoric acid is one which precipitates titanium (as a titanium phosphate) and which does not provide an unacceptable cation in the solution. Ammonium phosphate, for example may be a suitable salt of phosphoric acid.

It is preferred, however, to add ortho-phosphoric acid $(H_3PO_4)$ to the liquor Conveniently, the acid (or salt thereof) is added to provide a concentration of phosphate ions in the liquor equivalent to at least 30% of the stoichiometric quantity required to remove the titanium as $Ti_3(PO_4)_4$ and preferably one in the range 50% to 200%.

It may be advantageous to heat the solution either before or after the addition of the phosphoric acid or phosphate, for example to coagulate the precipitate for ease of separation.

The precipitated titanium phosphate may be separated from the mother liquor by any suitable method and the mother liquor, after separation, should preferably contain not more than 0.06% of titanium (expressed as $TiO_2$) and particularly not more than 0.01%, by weight.

The iron chloride solution, after removal of the solid leached material and soluble titanium by the process of the present invention may be treated for the recovery of hydrogen chloride, for example as described in British specification 793,700 and/or for its conversion to finely divided iron oxide or metallic iron, for example which may be suitable for production of shaped particles by sintering.

It has now been found that in some cases the addition of phosphoric acid (or a suitable salt thereof) even in quantities in excess of 200% of the stoichiometric quantity required to precipitate the titanium (as $$3TiO_2 \cdot P_2O_5 \cdot 6H_2O)$$

does not precipitate sufficient titanium from the liquor to enable an iron or iron oxide product having a low enough titanium content to be produced.

This has been found to be particularly true where the leach with hydrochloric acid has been carried out at a temperature substantially below the boiling point of the mixture, for example up to about 100° C. Under these conditions, more titanium remains in the leach solution since the hydrolysis of dissolved titanium and the consequent reprecipitation as insoluble $TiO_2$ takes place more readily at higher temperatures, for example at the boiling point of the mixture.

Additionally, some difficulty in precipitation of the titanium phosphate due to the presence of trivalent titanium may be experienced and in such cases, also, an additional treatment of the leach solution has been found to be of advantage.

One such treatment which has been found to be particularly advantageous is to add an oxidising agent to the leach liquors, particularly as noted above, to those which have been obtained by leaching at temperatures substantially below the boiling point of the mixture, for example in the range 90° C. to 100° C. and particularly those which have been obtained at the preferred leaching temperature of about 100° C.

Oxidising agents which have been found to be suitable are air, hydrogen peroxide or ferric ions, the latter, for example, in the form of an aqueous solution of ferric chloride. If desired, such solutions can be prepared by dissolving iron oxide in aqueous hydrochloric acid.

Where ferric ions are added as the oxidising agent, it is normally preferred to add these in at least sufficient quantity to oxidise all the oxidisable species in the solution and to provide a slight excess of ferric ions under the conditions of addition.

The following examples describe various embodiments of the invention:

EXAMPLE 1

Ilmenite (300 g.) containing 56.5% by weight of titanium (expressed as $TiO_2$) and 40.5% iron (expressed as FeO) was heated in air to oxidise the iron to the ferric state and subsequently reduced at 875° C. with hydrogen (containing 2% steam) until the iron was substantially completely reduced to the ferrous state.

The reduced ilmenite was boiled for 1 hour with a 20% stoichiometric excess of constant boiling aqueous hydrochloric acid. During boiling agitation was provided by bubbling nitrogen through the suspension.

The solid was separated and the process repeated with fresh acid. The mother liquors were combined.

The combined liquor containing 0.56 g./litre of titanium (expressed as $TiO_2$).

The liquor was divided into four equal samples and orthophosphoric acid added in various amounts to give the percentages of the stoichiometric amount required to produce $Ti_3(PO_4)_4$ shown in the table below.

After titanium was precipitated the precipitate was filtered off and the titanium content of the filtrate estimated. The following figures were obtained:

TABLE

| Percent of stoichiometric quantity of phosphoric acid added: | Ti (as $TiO_2$) unfiltered liquor, g./litre |
|---|---|
| 28 | 0.41 |
| 57 | 0.34 |
| 113 | 0.15 |
| 168 | 0.11 |

EXAMPLE 2

A Western Australian ilmenite was subjected to a preliminary oxidation until all the iron was in the ferric state and thereafter to reduction until the iron was in the ferrous state as described in Example 1 before leaching with aqueous hydrochloric acid at a temperature of 100° C. only.

The solids were separated from the leach liquor and this was found to contain 4.6 g./litre of titanium expressed as $TiO_2$.

A portion of this liquor was heated to 70° C. and twice the stoichiometric quantity of phosphoric acid ($H_3PO_4$) was added (based on $3TiO_2.P_2O_5.6H_2O$). After separation of the precipitated solids the liquor was found to still contain 3.0 g./litre of soluble titanium, expressed as $TiO_2$.

Another portion of the original leach liquor was heated to 70° C. and sufficient aqueous ferric chloride solution was added to provide a slight excess of ferric iron.

This solution was then divided into two parts which were treated as follows:

PART 1

A stoichiometric quantity of phosphoric acid was added (based on the conversion of titanium to
$$3TiO_2.P_2O_5.6H_2O$$
The precipitate formed was separated and the mother liquor contained only 1.2 g./litre of titanium, expressed as $TiO_2$.

PART 2

Twice the stoichiometric quantity of phosphoric acid (on the same basis as for part 1) was added and the precipitated formed was separated off.

The mother liquor contained only 0.26 g./litre of soluble titanium, expressed as $TiO_2$.

What is claimed is:

1. A process for the beneficiation of iron containing titaniferous material comprising:
    (a) leaching a particulate iron-containing titaniferous material with aqueous hydrochloric acid to form a solid beneficiate containing an increased proportion of titanium and a leach liquid containing both iron and titanium in solution,
    (b) separating the solid titanium-containing beneficiate from the liquid,
    (c) adding phosphate ion to said leach liquid in the form of phosphoric acid or a suitable salt thereof to the solution containing iron and titanium, said phosphate ion being added in an amount sufficient to precipitate a titanium phosphate, and
    (d) separating the iron-containing solution from the precipitated titanium phosphate and thereafter recovering the hydrogen chloride or the iron from the solution, said iron being recovered in the form of iron oxide or metallic iron.

2. A process as claimed in claim 1 wherein the iron-containing titaniferous material has been subjected to a preliminary oxidation and reduction.

3. A process as claimed in claim 1 wherein the particulate iron-containing titaniferous material has a mean weight particle size in the range $50\mu$ to $300\mu$.

4. A process as claimed in claim 2 wherein the mean weight particle size is in the range $50\mu$ to $200\mu$.

5. A process as claimed in claim 1 where the aqueous hydrochloric acid contains between 18% and 22% by weight of hydrogen chloride.

6. A process as claimed in claim 1 wherein the leaching is carried out at a temperature between 80° C. and the boiling point of the acid under atmospheric pressure.

7. A process as claimed in claim 6 wherein the leaching is carried out at a temperature in the range 90° C. to 100° C.

8. A process as claimed in claim 1 wherein a compound selected from the group consisting of orthophosphoric acid and ammonium phosphate is added to the liquid after separation of the solid titanium-containing material.

9. A process as claimed in claim 1 wherein sufficient of a compound selected from the group consisting of phosphoric acid and a salt thereof is added to provide at least 30% of the stoichiometric quantity of phosphate ions required to remove titanium as $Ti_3(PO_4)_4$.

10. A process as claimed in claim 9 wherein the amount of added phosphate ions is in the range 50% to 200% of the stoichiometric quantity.

11. A process as claimed in claim 1 wherein the solution is heated either before or after the addition of the phosphoric acid or phosphate.

12. A process as claimed in claim 1 wherein, the addition to a compound selected from the group consisting of phosphoric acid and a phosphate, there is added to the solution containing soluble iron and titanium, an oxidizing agent in an amount effective to aid precipitation of a titanium phosphate.

13. A process as claimed in claim 12 wherein the oxidising agent is selected from the group consisting of ferric ions, air and hydrogen peroxide.

14. A process as claimed in claim 12 wherein the oxidising agent is ferric chloride.

15. A process as claimed in claim 13 wherein ferric ions are the oxidizing agent and are added in sufficient quantity to provide excess ferric ions after the oxidizable species, under the conditions of the addition, have been oxidized.

References Cited
UNITED STATES PATENTS

| | | | |
|---|---|---|---|
| 2,238,586 | 4/1941 | Foerster | 75—1 |
| 2,038,078 | 4/1936 | Hardiek | 23—105 X |
| 3,402,041 | 9/1968 | Feld et al. | 75—6 X |
| 3,649,243 | 3/1972 | Williams et al. | 75—114 X |

OSCAR R. VERTIZ, Primary Examiner

G. A. HELLER, Assistant Examiner

U.S. Cl. X.R.

423—305; 75—114